(12) United States Patent
Derndinger et al.

(10) Patent No.: US 6,429,897 B2
(45) Date of Patent: Aug. 6, 2002

(54) CONFOCAL MICROSCOPE WITH A MOTORIZED SCANNING TABLE

(75) Inventors: Eberhard Derndinger, Aalen; Norbert Czarnetzki, Jena; Peter Ott, Aalen; Thomas Scherübl, Berlin, all of (DE)

(73) Assignee: Carl-Zeiss-Stiftung (DE)

( * ) Notice: Subject to any disclaimer, the term of this patent is extended or adjusted under 35 U.S.C. 154(b) by 0 days.

(21) Appl. No.: 09/779,960

(22) Filed: Feb. 9, 2001

Related U.S. Application Data

(63) Continuation of application No. 08/923,470, filed on Sep. 4, 1997.

(30) Foreign Application Priority Data

Apr. 7, 1997 (DE) .......................................... 197 14 221

(51) Int. Cl.⁷ .......................... H04N 5/335; H04N 7/18; G02B 7/04
(52) U.S. Cl. ....................... 348/295; 348/80; 250/201.3
(58) Field of Search ............................ 348/79, 80, 295; 250/201.3

(56) References Cited

U.S. PATENT DOCUMENTS 4,382,267 A * 5/1983 Angle ........................ 348/295
4,691,103 A * 9/1987 LePoole et al. .............. 250/311
5,170,037 A * 12/1992 Van Amstel et al. ......... 250/235
5,248,876 A * 9/1993 Kerstens et al. .......... 250/201.3
5,544,338 A * 8/1996 Forslund ...................... 711/217

* cited by examiner

Primary Examiner—Andrew B. Christensen

(57) ABSTRACT

A confocal microscope has a motorized scanning table for moving the sample perpendicularly to the optical axis of the microscope. The object is illuminated simultaneously at many places by means of a light source array. The light reflected or scattered at the object is detected by means of a diaphragm array, which is conjugate to the object and to the light source array. A sensor array is provided as a detector and makes a displacement of charges possible between individual positions in the scanning direction. The sensor is a so-called TDI sensor. The displacement of the charges is synchronized with the motion of the object corresponding to the motion of the image points in the plane of the sensor array. The image data can thereby be recorded during the motion of the object, so that even large object fields can be sensed in a short time with high lateral resolution. The motion of the object takes place along linear paths (if necessary linear paths combined in a meander form) and the motion along the linear paths takes place uniformly. The microscope is particularly suitable for inspection in the semiconductor industry (wafer inspection, LCD inspection).

42 Claims, 6 Drawing Sheets

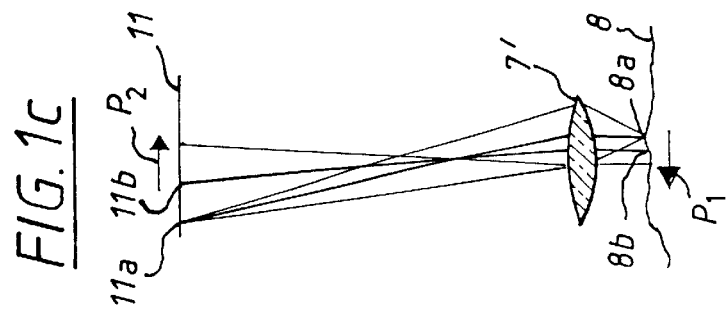
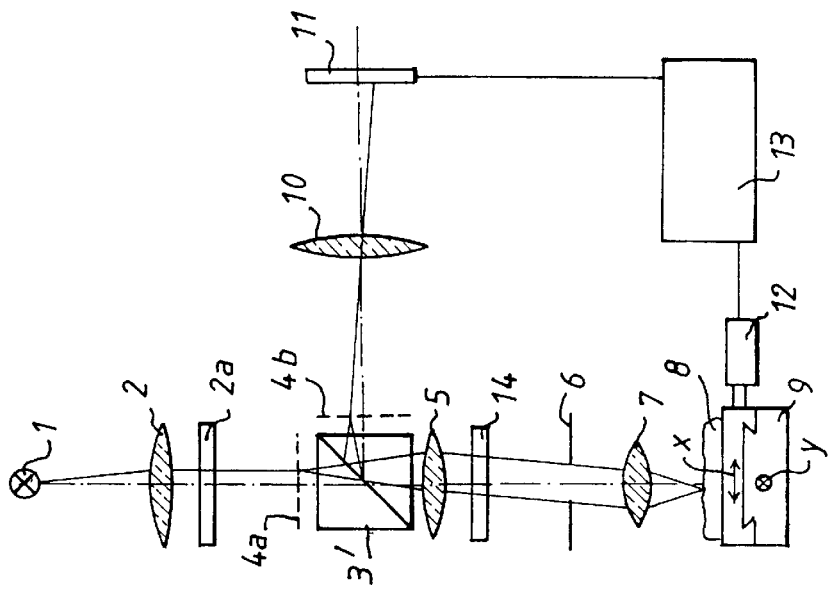
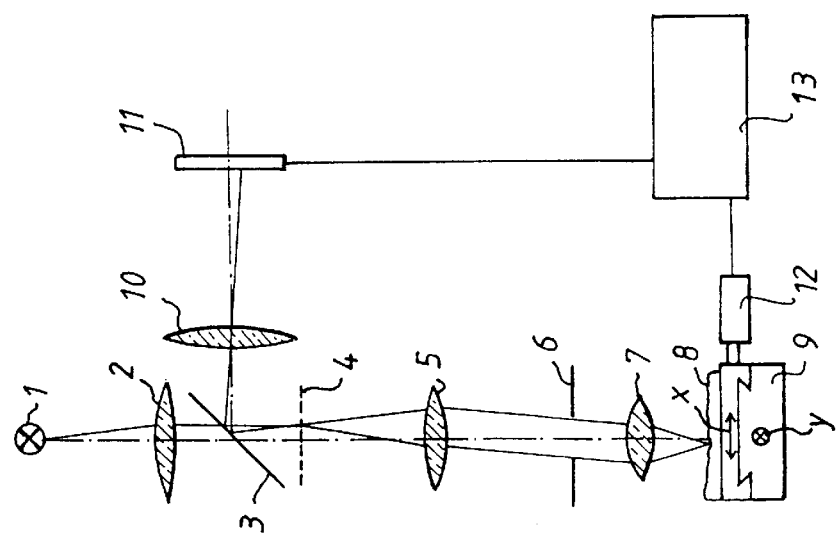

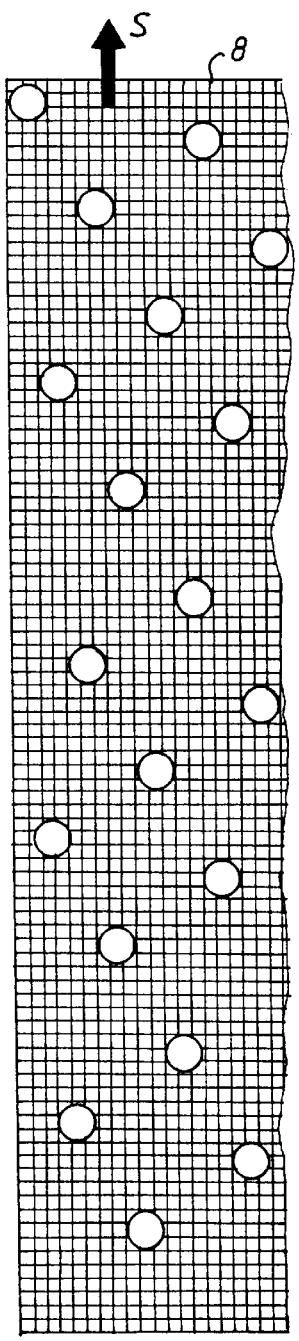
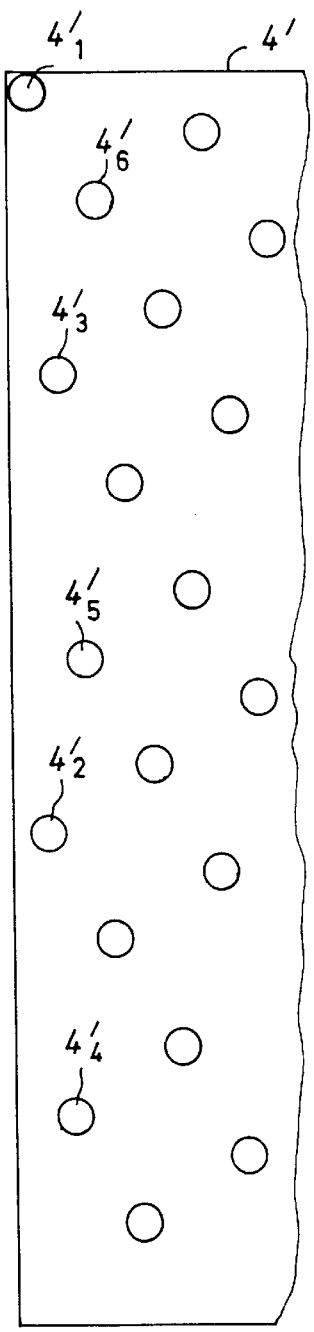
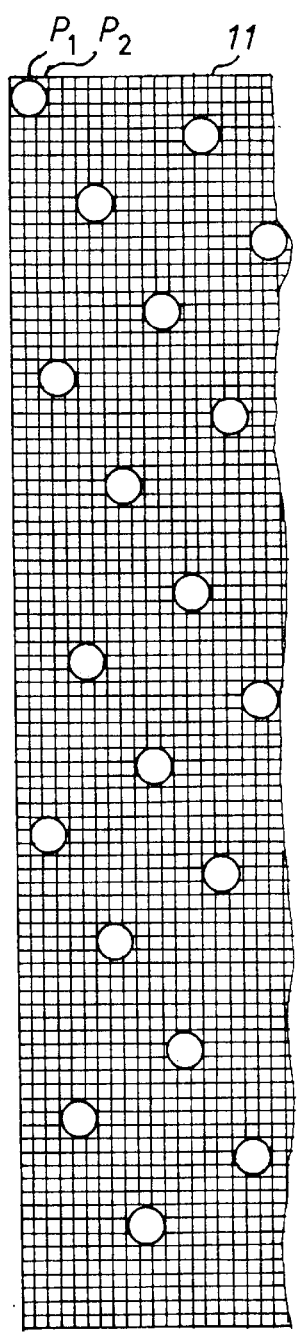

CONFOCAL MICROSCOPE WITH A MOTORIZED SCANNING TABLE

This is a Continuation of patent application Ser. 08/923,470, filed Sep. 4, 1997, of the same inventors.

BACKGROUND OF THE INVENTION

1. Field of the Invention

This invention relates to a confocal microscope and, more particularly, to a confocal microscope with a motorized scanning table for moving a sample perpendicularly to the optical axis of the microscope.

2. Discussion of Prior Art

A confocal microscope with a motorized scanning table to move a sample perpendicularly to the optical axis of the microscope is known from U.S. Pat. No. 5,239,178. Furthermore, the microscope has a light source array in a plane conjugate to the focal plane of an objective, and a detector array with numerous light-sensitive elements, also in a plane conjugate to the focal plane of the microscope objective. The movement of the specimen perpendicularly to the optical axis of the microscope takes place primarily in the microscopic region in order to increase the resolution, otherwise defined by the raster spacing of the light source array, perpendicular to the optical axis.

With this confocal microscope, sensing large object fields that are substantially greater than the visual field imaged by the objective is only possible to a limited extent. A series of individual images of the object must be recorded. Between each individual image, the object must be displaced over a path length corresponding to the image field diameter.

A Nomarski microscope (not confocal) is designed for taking and storing corresponding series of images, and is described, for example, in European Patent EP 0 444 450-A1. Since this Nomarski microscope is not confocal, it has only a small resolution in the direction of the optical axis. Furthermore, this microscope is much too slow when the image data in a large number of image fields must be sensed. The sensing of large object fields in the shortest possible time, with high resolution, is imperative in inspection equipment used in production processes, for example, in the semiconductor industry or in LCD production.

A microscope used for wafer inspection, also not confocal, is described in U.S. Pat. No. 5,264,912. In it, filtering takes place in the Fourier plane of the objective. The transmission characteristic of the spatial filter in the Fourier plane corresponds to the inverse diffraction figure of the integrated circuit (IC) that is being produced. Consequently, the filter transmits light only when the diffraction image of the momentarily imaged IC deviates from the diffraction image of the reference IC, and it can be concluded that the structure of the observed IC deviates from the reference structure. In this microscope, a CCD array or, alternatively, a high speed multiple output time delay integration (TDI) sensor is provided as the light detector. However, the reason for using a TDI sensor is not stated. Furthermore, because of the non-confocal arrangement, this microscope also has only a small resolution in the direction of the optical axis.

Furthermore, U.S. Pat. No. 5,365,084 includes an arrangement for inspecting a running length of fabric during its manufacture, in which a TDI sensor is used, synchronized with the motion of the length of fabric. However, such a video inspection device cannot be considered for inspecting semiconductors in a production process, because of its low resolution both in the direction of the optical axis and perpendicular to the optical axis.

SUMMARY OF THE INVENTION

The object of the present invention is to provide an arrangement that can be used for the optical inspection of semiconductors in the production process. With this arrangement, a further object is to achieve a sufficient resolution both in the direction of, and also perpendicular to, the optical axis. At the same time, an object is to sense large image fields in the shortest possible time. These objects are achieved by a confocal microscope including:

- A motorized scanning table for moving an object at right angles to the optical axis of the microscope;
- A diaphragm array in a plane that is conjugate to the focal plane of the microscope objective;
- A sensor array following the diaphragm array in an observation direction with a plurality of photosensitive elements, charge storage elements associated with the photosensitive elements, and a device for displacing charges stored in the charge storage elements from one storage element to another storage element; and
- A synchronizing unit for effecting displacement of the charges corresponding to motion of an image point of an object point in a plane of the sensor array.

The arrangement according to the invention is a confocal microscope with a motorized scanning table to move the specimen perpendicularly of the optical axis of the microscope. It has a diaphragm array with numerous light transmitting regions, so-called pinholes, in a plane that is conjugate to the focal plane of the microscope objective. The diaphragm array is followed by a sensor array that has numerous photosensitive elements. Each photosensitive element is associated with a charge storage element. Furthermore, the sensor array has a device for displacing the charges stored in the charge storage elements from one storage element to another storage element, as in the case in the so-called TDI sensors. Furthermore, a synchronizing unit is provided that effects displacing charges corresponding to the movement of the image point of a specimen point in the plane of the sensor array.

In the confocal microscopic arrangement, high resolution both in the direction of the optical axis and perpendicular to the optical axis, which is usual for confocal microscopes, is attained. The resolution that can be attained by using a strong magnifying objective, for example, one having a magnification of 20–120 times, is sufficient for semiconductor inspection. By using a diaphragm array, and the numerous parallel confocal beam paths associated with the diaphragm array, a number of object positions is sensed that correspond to the number of pinholes in the diaphragm array. By synchronizing the displacement of the charges in the sensor array corresponding to the motion of the image point of an object point, the measurement takes place while the sample is in motion. Preferably, the motion of the sample takes place along linear paths that extend over the complete length of the sample in the direction of motion. For sensing large, two-dimensional surfaces, corresponding linear paths can be combined in a meander form. Short acceleration or deceleration segments, during which no signal recording takes place, occur respectively at the start and at the end of each linear path. Between these acceleration and deceleration segments, the motion of the sample is uniform, so that the movement of charge between the storage elements of the sensor array and the motion of the image point on the sensor array are mutually synchronized.

In order to produce the parallel confocal beam paths, a light source array that has numerous mutually spaced-apart light sources is arranged in a plane conjugate to the focal plane of the objective. The positions of the individual light sources are conjugate to the positions of the transparent regions of the diaphragm array. Corresponding light source arrays can be formed in different ways. The simplest variant results when the diaphragm array is arranged in a common portion of the illumination and observation beam paths, and the diaphragm array is illuminated from the back. However, this simple arrangement has a disadvantage, in that a substantial portion of the illuminating light is reflected at the back side of the diaphragm array and thus produces a strong signal background on the sensor array. Such a strong signal background can be prevented by providing two separate diaphragm arrays, one in the illuminating beam path and the other in the observation beam path or measuring beam path. The diaphragm array in the illumination beam path is then again illuminated from the back. For a more effective use of light, the diaphragm array in the illumination beam path can be preceded by a lens array, as described in U.S. Pat. No. 5,239,178. In an alternative to using diaphragm arrays illuminated at the back, the light source array can also be formed by light-conducting fibers with their end surfaces arranged in an array. Likewise, as an alternative to a lens array, a correspondingly constructed diffractive element may be used.

As the sample is scanned, the diaphragm array, the light source array, and the sensor array are at rest. All three components are mutually stationary.

Preferably, the sensor array is a two-dimensional array of photosensitive elements and charge storage elements associated with the photosensitive elements, with numerous columns arranged parallel to each other. The direction of the columns is then defined by the direction in which the charges are displaced between the charge storage elements. On the one hand, the light source array and diaphragm array, and on the other hand, the sensor array, are arranged relative to each other so that at least one transparent region of the diaphragm array is imaged on each of the mutually parallel columns of the sensor array.

TDI sensors may be used as the corresponding sensor array. To the extent that such TDI sensors have light-insensitive regions between the photosensitive surfaces, these can be arranged, and the imaging between the diaphragm array and the sensor can be chosen so that the transparent regions of the diaphragm array are exclusively imaged on the photosensitive regions.

The transparent regions of the diaphragm array are formed, corresponding to the direction of motion of the scanning table and to the imaging ratio between the object plane and the diaphragm array, so that the paths of the images of all the transparent regions, closely fill, preferably without a gap, a portion of the focal plane, while maintaining the confocal filtering. With linear, one-dimensional scanning of the object, the image data for a strip whose width corresponds to the width of the image section sensed perpendicularly to the direction of motion is sensed completely confocally, without micro-movements perpendicular to the direction of motion required. For this purpose, the transparent regions of the diaphragm array may be arranged in the form of a two-dimensional rhombic grid. The midpoint of each transparent region then corresponds to the position of the theoretical grid point. However, it is particularly advantageous to arrange the transparent regions of the diaphragm array in the form of a rectangular grid, the grid axes of which are rotated relative to the linear direction of motion. Such a rectangular geometry confers advantages when the light source array is formed in the form of a fiber illumination, a lens array, or as a diffractive element producing a corresponding illumination.

Preferably, a particularly advantageous sensor array has several mutually independent two-dimensional partial sensor arrays that are arranged one behind the other in the column or stage direction, and that are respectively offset, perpendicularly to the column direction or stage direction, by a distance $\Delta = d/n$ from each other, where d is the spacing of the individual sensors perpendicularly to the column direction and n is the number of two-dimensional partial arrays. Such an offset arrangement of several two-dimensional sensor arrays has an image field that is larger by the number of two-dimensional arrays in anamorphotic imaging of the diaphragm array on the sensor array, in contrast to an arrangement of a single sensor array with the same number of photosensitive elements, so that a correspondingly large signal/noise ratio results.

BRIEF DESCRIPTION OF THE DRAWINGS

Details of the invention are described in further detail herein below taken together with the accompanying drawings, in which:

FIG. 1a comprises a schematic of the principles of a first embodiment of the invention, with a single pinhole array arranged in the common portion of the illuminating and observation beam paths;

FIG. 1b shows a second embodiment of the invention with separate light source array and diaphragm array;

FIG. 1c is a schematic explaining the principle of the synchronization between object motion and charge displacement in the sensor array;

FIG. 2b is a detailed representation of the functioning sequence in the microcontroller of FIG. 2a;

FIGS. 4a–4c show sections of a diaphragm array forming a rectangular grid and the associated image points in the object plane and the plane of the sensor array;

FIG. 5b is a schematic of the principle of a pinhole array suitable for the sensor array of FIG. 5a.

DETAILED DESCRIPTION OF PREFERRED EMBODIMENTS

Figure 2A:
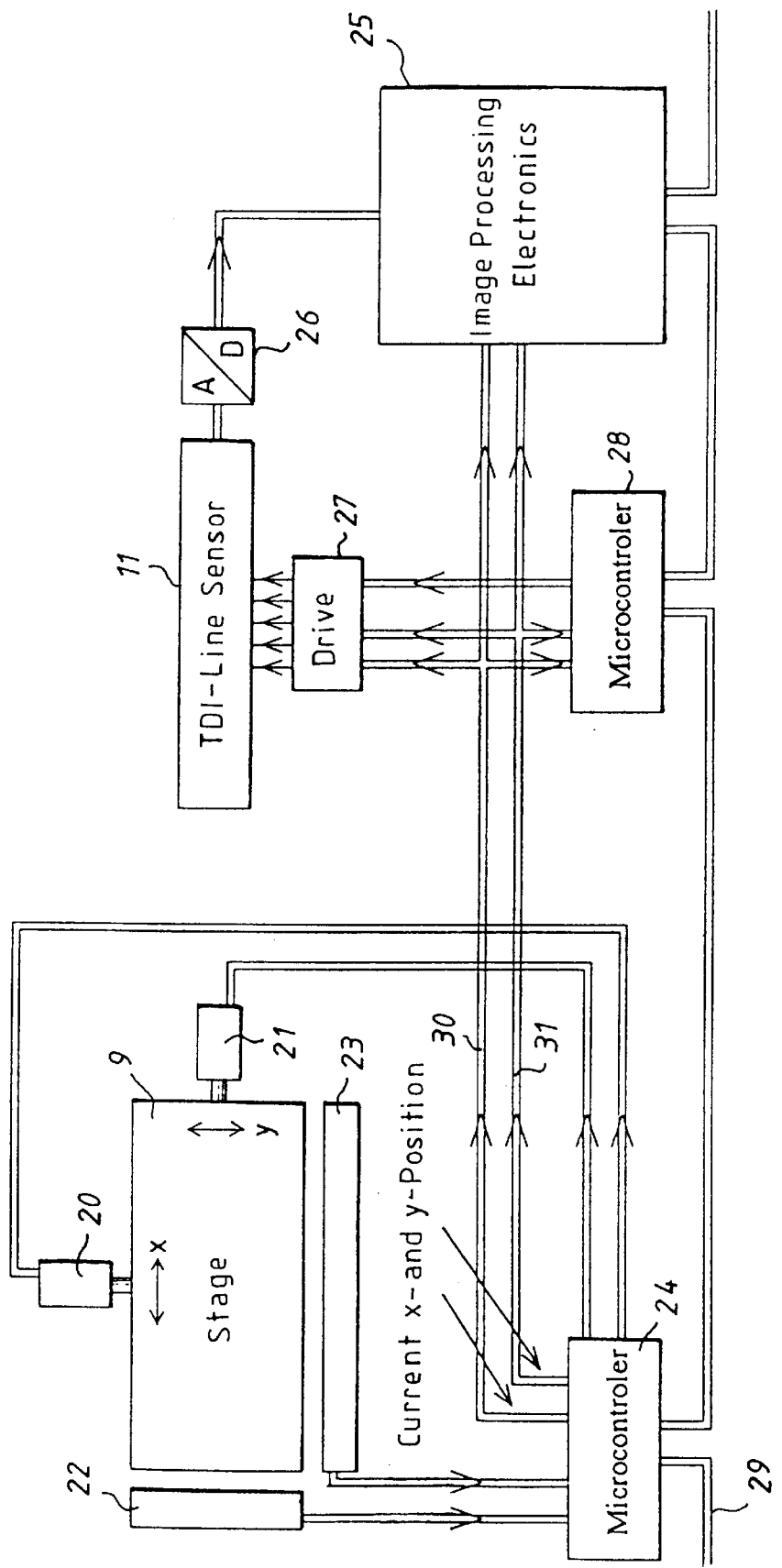
FIG. 2a is a block circuit diagram for the synchronization between the object motion and the charge displacement in the sensor array.

In the confocal microscope according to the invention shown in FIG. 1a, a single diaphragm array (4) with numerous transparent regions or holes is arranged in the common portion of the illumination and observation beam paths. This arrangement forms, at one and the same time, the diaphragm array for the detection beam path and the light source array for the illumination of the object (8). For this purpose, the diaphragm array (4) is uniformly illuminated from the back side by a light source (1) that is followed by a condenser (2). Each transparent region, or each pinhole, of the diaphragm array (4) thus forms a secondary light source.

A tube lens (5) with a microscope objective (7) is arranged after the diaphragm array (4) in order to image the diaphragm array (4) on the object (8) positioned on the motorized scanning table (9). The microscope objective (7) is shown, greatly simplified, as a single lens in FIG. 1a. The microscope objective (7) is corrected to an infinite focal intercept, and thus to an infinite image distance. This is indicated in FIG. 1a by the telecentering diaphragm The diaphragm array (4), and thus also the light source array imaged by the diaphragm array (4), is arranged, by means of the tube lens (5) and the telecentric imaging, to be confocal with the focal plane of the objective (7). A pattern of illumination corresponding to the image of the diaphragm array (4) arises in the focal plane of the objective (7). The object (8) is illuminated at the points that are conjugate to the transparent regions of the diaphragm array (4). The light scattered or reflected by the object (8) is imaged backward again, by the objective (7) with the subsequent tube lens (5), onto the diaphragm array (4). In this backward imaging, the diaphragm array (4) effects confocal filtering, resulting in only such light being transmitted through the transparent regions of the diaphragm array (4) as was scattered or reflected in regions of the object (8) that are confocal to the transparent regions of the diaphragm array (4). In contrast to this, the light that is scattered or reflected on the object (8) above or below the focal plane of the objective (7) is trapped by the non-transparent regions of the diaphragm array (4). This confocal microscope results in high resolution in the direction of the optical axis (z-direction), denoted by a dot-dash line. For separating the illumination and observation beam paths, a beam-splitter mirror (3) is arranged between the diaphragm array (4) and the condenser (2), and a portion of the light scattered or reflected at the object (8) and transmitted through the diaphragm array (4) is reflected out towards the sensor array (11). A further imaging optics (10) that images the diaphragm array (4) on the sensor array (11) is provided in the reflected beam path; that is, between the beam-splitter mirror (3) and the sensor array (11). The sensor array (11) is a so-called TDI sensor (Time Delay and Integration), such as is offered, for example, by DALSA Inc., Ontario, Canada, under the reference IT-E1 or IT-F2. Such a TDI sensor has 2048 columns each with 96 TDI stages or rows. A photosensitive region and a charge storage element is associated with each TDI stage in each column, so that the number of pixels (photosensitive regions) and charge storage elements amounts to 96×2048. The diaphragm array (4) has at least a number of transparent regions corresponding to the number of columns of the TDI sensor, so that at least one transparent region of the diaphragm array (4) is imaged on each column of the TDI sensor. The detailed imagewise arrangement of the pixels of the TDI sensor and of the transparent regions is described in more detail herein below with reference to FIGS. 3a–3c and 4a–4c.

The scanning table (9) can be moved by motor drive in two directions perpendicular to the optical axis, and senses large object regions. Its motion is sensed by means of two position measuring systems (12). The summed charges in the charge storage elements of the TDI sensor (11) are displaced in the stage direction by means of a synchronization unit (13), corresponding to the motion of the scanning table (9). For this purpose, the motion of the scanning table takes place along (possibly several) linear paths of movement, so that on the TDI sensor (11) the image point belonging to an object point is displaced along the columns. This state of affairs will be explained with reference to the simplified representation of FIG. 1c. Suppose that, at a first instant, an object point (8a) is imaged at an image point (11a) on the TDI sensor (11). Due to the motion of the scanning table (9), a motion of the object (8) results in the direction of the arrow (P1) and at a somewhat later instant the object point (8a) has traveled to position (8b). Simultaneously with the motion of the object (8), the charges stored in the charge storage elements of the TDI sensor (11) are displaced in the direction of the arrow (P2) from the stage (11a) to the stage (11b). Measurement can proceed during the motion of the object (8) due to this synchronization between the motion of the object (8) and the motion of the charges. The motion of the object (8) therefore does not take place in start-stop operation but uniformly during the measurement. Substantially shorter measurement times are attained at the same signal/noise ratio compared to arrangements in which the object motion takes place in start/stop operation and a measurement takes place when the object is stationary.

The complete scanning of the object field at right angles to the direction of motion of the scanning table (9) takes place through an arrangement of the transparent regions that is offset at right angles to the direction of motion. In combination with the synchronization of the charge displacement in the sensor array corresponding to the motion of the image point of an object point, the whole object field, which corresponds to the row width of the sensor array, is sensed. Due to the offset arrangement of the diaphragms in the diaphragm array, the paths of the image points of the diaphragms lie close together, without gaps, in the focal plane of the objective (7). Complete sensing of the image field is possible without any micro-displacements at right angles to the direction of motion. This reduces the costs of data storage (data sorting) and reduces the tolerance requirements on the motion of the scanning table.

In the embodiment according to FIG. 1b, components corresponding to the individual components of the embodiment according to FIG. 1a are referenced with the same symbols as in FIG. 1a. The difference between the embodiment according to FIG. 1a and in FIG. 1b is that the diaphragm array (4b) is arranged following the beam splitter (3') in the observation beam path or the detection beam path. The illumination beam path has its own diaphragm array (4a), which forms the light source array. The two diaphragm arrays (4a) and (4b) are arranged conjugate to each other and conjugate to the focal plane of the objective (7). The transparent regions of the two diaphragm arrays (4a) and (4b) are also mutually conjugate. The use of separate diaphragm arrays (4a, 4b) in the illumination and observation beam paths avoids producing a large signal background on the TDI sensor (11) due to the relatively large proportion of light reflected at the diaphragm array (4a) of the illumination beam path.

In addition, in the embodiment according to FIG. 1b, the beam splitter (3') is constructed as a polarizing beam splitter, and the illumination of the diaphragm array (4a) in the illumination beam path also takes place with polarized light, denoted by a polarizer (2a) preceding the diaphragm array (4a). In addition, a quarter wavelength plate (14) is provided on the object side of the beam splitter (3') and, in a known manner, effects a rotation of 90° in the polarization of the light that is transmitted twice through the quarter wavelength plate (14). Using polarized light, a polarizing beam splitter (3') and a quarter wavelength plate (14) results in a better use, by a factor of four, of the light present behind the condenser (2), compared to the embodiment according to FIG. 1a. However, a corresponding arrangement of polarizing beam splitter, polarizing filter and quarter wavelength plate is also possible in the embodiment with only one diaphragm array according to FIG. 1a.

Figure 3A:
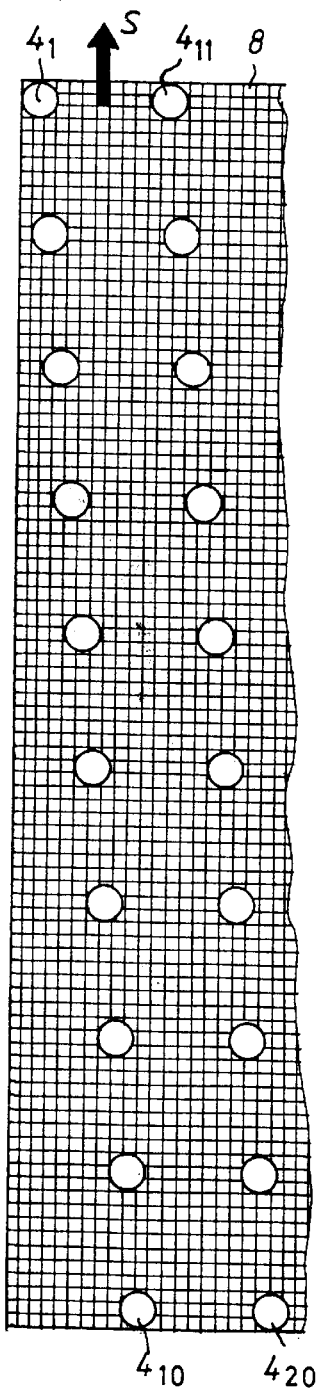
FIGS. 3a–3c show sections of a diaphragm array forming a rhombic grid and the associated image points in the object plane and in the plane of the sensor array.
Figure 3B:
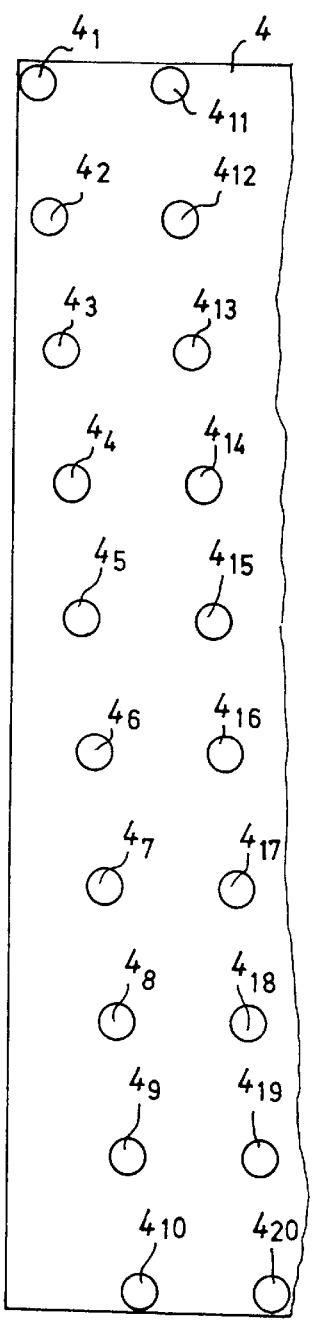
Figure 3C:
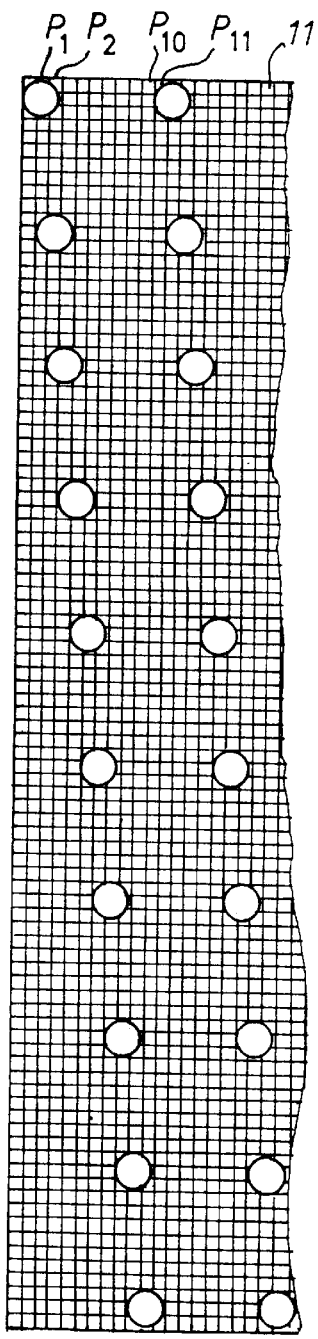

A first embodiment of a diaphragm array (4, 4a, 4b) is shown in FIG. 3b. The diaphragm array (4) contains a number of transparent regions, of which only 20 ($4_1$–$4_{20}$), are shown in FIG. 3b for reasons of clarity. The diameter of each transparent region ($4_1$–$4_{20}$) corresponds to about half the diameter of the Airy disk, and with an objective of numerical aperture NA=0.95 and for a wavelength lambda=365 nm amounts to about 0.25 μm multiplied by the imaging scale between the object (8) and the diaphragm array (4, 4a, 4b). In order to obtain the best possible confocal filtering, the spacing of closest neighboring transparent regions is at least 4 times the diameter of the transparent regions. The transparent regions ($4_1$–$4_{20}$) form a two-dimensional rhombic grid. The angle between the two grid axes is chosen so that, taking into account the imaging ratio between the diaphragm array (4, 4b) and the TDI sensor (11), the center of respective closest neighboring transparent regions is imaged on neighboring columns of the TDI sensor (11). This imagewise arrangement is shown in FIG. 3c. Each square in FIG. 3c represents a photosensitive region. The 96 stages are represented in the vertical direction, and a section of the 2,048 columns in the horizontal direction, the columns being denoted by (P1, P2, P10, P11). As can be gathered from the view of FIGS. 3b and 3c, the transparent region ($4_1$) is imaged on the column (P1); the transparent region ($4_2$) on the column (P2); and so on, on different columns of the TDI sensor (11). At the same time, the transparent regions ($4_1$–$4_{10}$) are imaged on different stages. The stage position, again corresponding to the stage position of the region ($4_1$) is the stage position on which the transparent region ($4_{11}$) is imaged.

FIG. 3a shows the image of the diaphragm array (4) and the TDI sensor (11) in the focal plane of the objective (7), and hence in a sectional plane of the object (8). The images of the transparent regions of the diaphragm array (4) are denoted using the same symbols as in FIG. 3b. Each square that has been drawn represents the image of the associated photosensitive region of the TDI sensor 11. The linear direction of motion of the scanning table (9) on the long meander paths is denoted by the arrow (S).

The same situation as in FIGS. 3a–3c is shown in principle in FIGS. 4a–4c for an alternative diaphragm array (4') (see FIG. 4b). In this alternative embodiment for the diaphragm array (4'), the transparent regions correspond in their diameter and their distance to the neighboring transparent region to those of FIG. 3b. These transparent regions are arranged so that a rectangular two-dimensional grid of transparent regions results. The grid axes of the rectangular grid are rotated relative to the scanning direction (arrow S) so that here (as in previously described the embodiments according to FIGS. 3a–3c) a respective transparent region ($4_1$–$4_{6'}$) is imaged on a respective column of the TDI sensor (11). In FIG. 4a the image of the diaphragm array (4') and of the TDI sensor (11) are again shown in the focal plane of the objective (7).

The rectangular grid arrangement of the transparent regions confers constructional advantages when the light source array (4a) is not constituted solely by a diaphragm array that is homogeneously illuminated from the back, but by a diaphragm array with a preceding lens array, a diffractive element, or a preceding fiber array for better illumination of the transparent regions of the diaphragm array (4a). With resulting secondary light sources that are sufficiently formed as points, an illuminating diaphragm array (4a) may even be dispensed with.

Figure 2B:
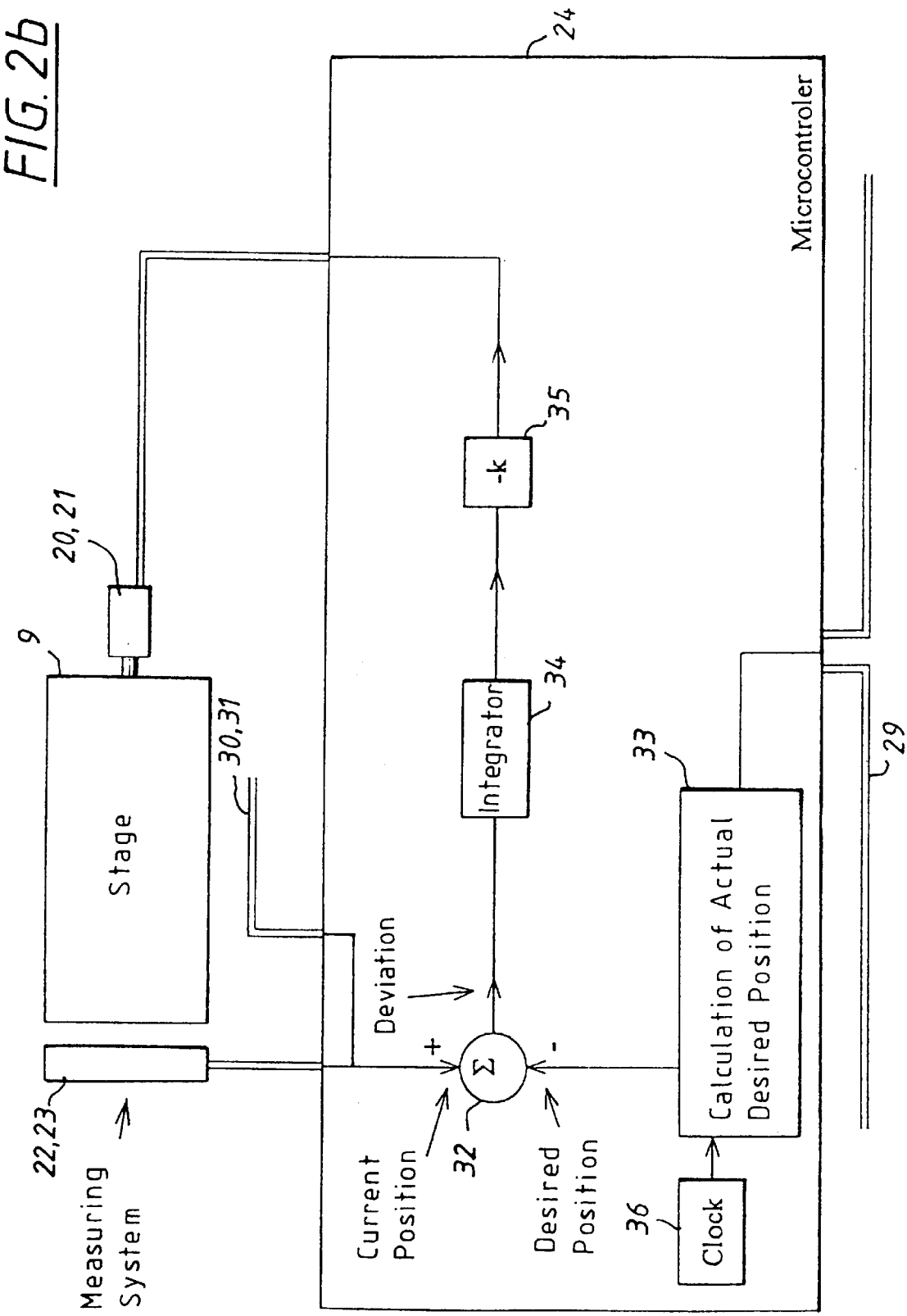

The electronics required for controlling the object motion and the simultaneous synchronization of the charge displacement is now described, with reference to the block circuit diagrams in FIGS. 2a and 2b.

Essentially, the object table or stage (9) consists of table elements that are displaceable in two mutually perpendicular directions, the motorized drives (20, 21), the position measuring systems (22, 23), and a microcontroller (24). The object table itself (9) is displaceably received, for a focusing in the direction of the optical axis, on a stand (not shown). The two motorized drives (20, 21), for producing motion in two orthogonal directions are preferably constituted as linear drives. The position measuring systems (22, 23) that sense the motion or deflection of the table (9) independently of each other in the two mutually perpendicular directions, are constructed as length measuring interferometers. When the table moves in the direction of the measuring beam path of the associated interferometer, these interferometers provide an intensity of irradiation on a radiation sensor that has a sinusoidal dependence on the path traveled. The period of the sinisoidal signal which is proportional to the wavelength of the measuring light used is then directly associated with the distance traveled. At the beginning of a measurement, a null position is traveled to, since the measuring signal has ambiguities for long traveled paths, and an absolute calibration is required. At each later instant, the present position is then given in relation to this null position by the number of times the interferometer signal passed through zero, together with the phase difference of the detected sine wave signal in the calibration position and the present position.

The microcontroller (24) controls the drives (20, 21) of the object table (9) corresponding to the present position values that are supplied by the measuring systems (22, 23), and to the reference position values that are determined by a host computer (not shown) via a bus line (29). FIG. 2b shows (on a larger scale), the controller circuit required for this purpose within the microcontroller 24. The data supplied via the control bus, for example, a CAN bus, is converted in an arithmetic logic unit (ALU) (33) into the present reference positions. In a further ALU (32) that follows, the values determined in the ALU (33) are respectively subtracted from the values supplied from the two measuring systems (22, 23), so that the difference represents the amount of deviation between the actual position and the reference position. This difference is integrated over time in an integrator (34) and then multiplied in a unit (35) by a factor that gives the amplification of the open control circuit. This factor is as a rule negative, in order to effect a phase displacement of 1800. This amplified and time integrated difference signal then represents the drive signal for the drives (20, 21).

The values of the present reference positions in the two mutually perpendicular directions are simultaneously passed on by the ALU (32) via data leads (30, 31) to a further microcontroller (28), a drive (27) for the reading out, or the cycle timing, of the TDI sensor (11), and an image processing electronics (25). The drive (27) (driven by the microcontroller (24)), effects a displacement of the charges stored in the TDI sensor corresponding to the travel of each image point on the TDI sensor (11). The charge data read out from the TDI sensor (11) are digitized by an A/D converter (26) and are then also passed on to the image processing electronics (25). In this manner, the image processing electronics (25) obtains the information for which table position the radiation intensities recorded with the TDI sensor are to be entered into the image to be produced. Here, the electronics takes into consideration the delays which are caused by the systematic properties of the TDI sensor. Should the table be located at a position outside the region to be sensed by the recording, the values given by the TDI sensor remain unconsidered.

The image processing electronics first carries out a restoration of the recording. Constant and linear errors (that can arise, for example, due to changes of the radiation intensity, or due to deviations of the dimensions of the transparent regions within the diaphragm array, or deviations of the table speed from the reference speed, or different sensitivity characteristics of the pixels of the TDI sensor) are thereby compensated. After such constant or linear errors are compensated, the structures of the object (for example, of the illuminated wafer) can be suppressed somewhat by suitable filtering, in order to better establish the existence of errors between the dies.

In order to carry out a so-called die-to-die comparison, the portions of the recording that are to be compared with each other are brought to cover one another, with pixel accuracy, taking into account errors in the table system. The portions of the recording to be compared are then subtracted one from another, the die-to-die comparison is carried out, and defects such as contaminating particles are detected by exclusive threshold formation.

With reference to FIGS. 2a and 2b, in the control circuit described above, the nominal desired speed and the course of the table are predetermined by the host computer. With the aid of the clock (36) built into the microcontroller (24), the microcontroller calculates from the speed standards the reference position of the table and the cycle time according to which the table is regulated, and the cycle times are set for the drive (27) for the TDI sensor and for the image processing electronics. As an alternative to this, the cycle times for reading out the TDI scanner and the image processing electronics are set directly from the host computer. In this case, the reference position is not passed on via the data leads (30, 31), but the momentary actual positions are passed on to the image processing electronics (25).

Preferably, the image recording of a large object field takes place by an object table motion of meander form, in which the long motion is oriented so that the image points travel in the direction of the 96 stages of the TDI sensor. The motion then takes place at a constant speed over the image region to be recorded. After the object has been scanned in one direction, a displacement of the table takes place in the direction perpendicular to this, so that now when scanning the nearest long meander path, the neighboring object regions are imaged on the TDI sensor. Scanning out then takes place in the opposite direction, wherein at the same time the direction of the charge transport between the storage elements of the TDI sensor is reversed. Here it is of course required that the TDI sensor have bidirectional scanning properties, so that the charges are displaceable in the two opposite directions. The sensor can be, for this purpose, an IT-F2-Type of DALSA, Inc.

The frequency that is predetermined by the host computer or by the clock (36) of the microcontroller (24) is determined so that the object table is moved at the maximum speed possible for a readout of the TDI rows with the maximum frequency, while taking into account the imaging scale and the image drift.

A change of the objective (7) is required to change the imaging scale. Preferably, this takes place by means of a coded revolving nosepiece, where the scale data of the objectives belonging to the positions of the revolving nosepiece are stored in a memory. A matching of the mutually synchronized speed between the reading out of the TDI sensor and the object table can then also occur when the revolving nosepiece position is changed.

As a rule, a change in the imaging scale is associated with a change in the diaphragm array, since the diameter of the transparent regions remains matched to the size of the Airy disk, which depends on the numerical aperture of the objective.

Figure 5A:
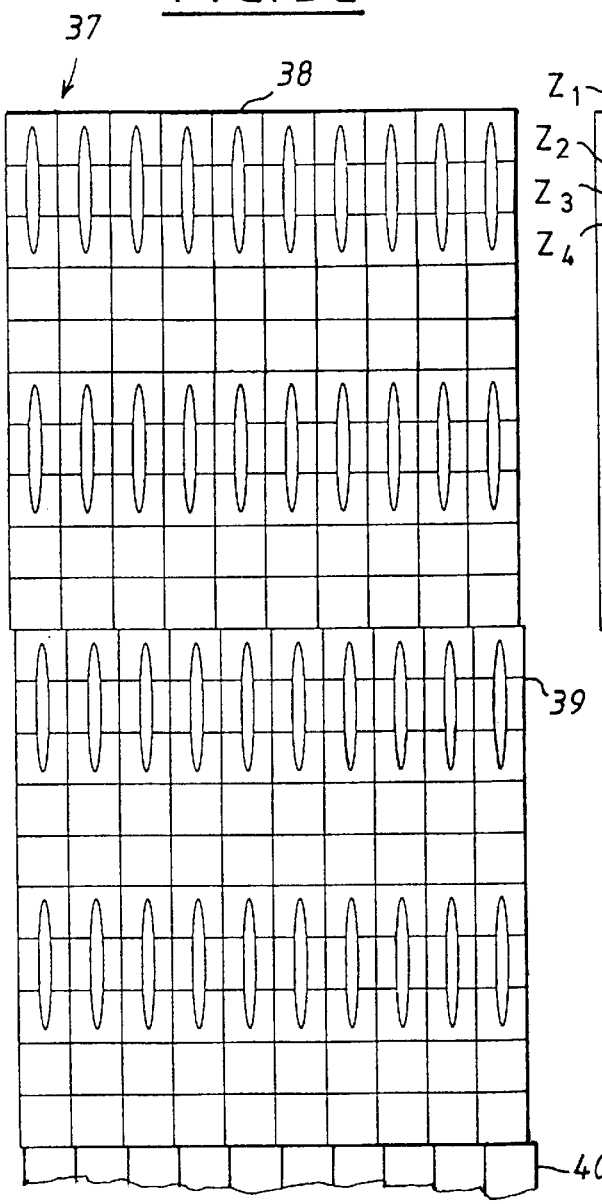
FIG. 5a shows a schematic representation of a sensor array consisting of several two-dimensional partial sensor arrays that are arranged mutually offset.
Figure 5B:
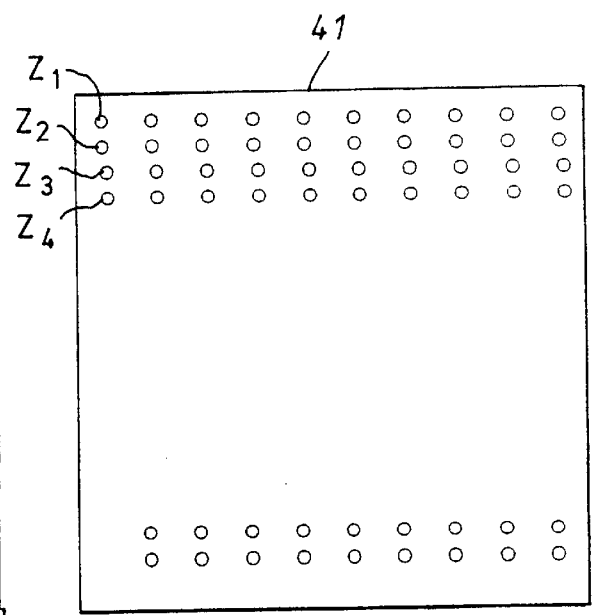

A particularly advantageous arrangement of a TDI sensor in combination with the present invention is shown in FIG. 5a. The TDI sensor (37) consists of several partial sensors (38, 39, 40), that are arranged one after the other in the stage direction, and that are mutually offset in the pixel direction (the horizontal, in FIG. 5a) by the distance $\Delta=d/n$, where d is the pixel spacing and n is the number of partial sensors. Together with an anamorphotic imaging of the diaphragm array (41) (FIG. 5b) on the composite TDI sensor, an improvement in the signal/noise ratio corresponding to the number of partial sensors (38, 39, 40) arranged one behind the other results, compared to a TDI sensor having an identical total surface area. In the embodiment shown in FIG. 5a, a total of 9 partial sensors (38, 39, 40), again with 96 stages respectively, are arranged one behind the other. The stage direction here again corresponds to the motion of the object point when the object is scanned. The imaging of the diaphragm array (41) then takes place with a 9 times greater imaging scale in the scanning direction than in the direction at right angles to it. By this anamorphotic imaging, the transparent regions lying in the first two rows ($Z_1$, $Z_2$) of the diaphragm array (41) are then imaged on the first partial sensor (38); the two succeeding rows ($Z_3$, $Z_4$) are imaged on the second partial sensor (39); and so on. This anamorphotic imaging is shown in FIG. 5a by the oval images of the circular transparent regions of the diaphragm array (41). First, the offset arrangement of several partial sensors makes it possible to image the transparent regions that are imaged on each partial sensor as right-angled, partial grids directed parallel to the rows and columns of the partial sensors. Second, at the same time, the partial grids are mutually offset in correspondence with the mutual offset of the partial sensors, so that the whole image field is sensed without gaps when the image data of the partial TDIs are correspondingly sorted to obtain the correct sequence. Several transparent regions can thereby be imaged on one column of each partial sensor at different stage positions, resulting in the improved signal/noise ratio. In the illustrations of FIGS. 5a and 5b, two transparent regions are imaged on each pixel position at correspondingly offset stage positions of the same partial sensor (38). However, the use of only two transparent regions per pixel position serves only for illustration. In order to optimally use the surface of the sensor (37) at a predetermined ratio of diameter of the transparent regions to the spacing of the transparent regions, the number of the transparent regions can be chosen corresponding to the number of partial sensors (38, 39, 40), so that with 9 partial sensors, an amount of light per pixel result that is greater by a factor of 9 than in the embodiments according to FIGS. 3a–3c and 4a–4c, so that with the same signal/noise ratio, the scanning of the object can take place at 9 times the speed.

Due to the anamorphotic imaging, all columns of all the partial sensors contribute to image production. A sensor array of several partial sensors may also be put to use in combination with a normal, non-anamorphotic imaging of the diaphragm array on the sensor array. In this case, only a portion of the columns of the partial sensors contributes to the formation of the image.

Instead of TDIs as the partial sensors, an arrangement of a corresponding number of row sensors in a mutually offset arrangement is conceivable. Such an arrangement can be compared, in terms of light sensitivity, with the embodiments according to FIGS. 3a–3c. Of course, in comparison, the sensor surface used is clearly reduced.

We claim:

1. A confocal microscope having an optical axis and an objective with a focal plane, comprising:

a motorized scanning table for moving an object at right angles to said optical axis of said microscope, a diaphragm array in a plane that is conjugate to said focal plane of said microscope objective, a sensor array following said diaphragm array in an observation direction, with a plurality of photosensitive elements, said diaphragm array effecting a confocal filtering of light scattered or reflected at said object before reaching said sensor array, charge storage elements associated with said photosensitive elements, a device for displacing charges stored in said charge storage elements from one charge storage element to another charge storage element, wherein said object is moved along a plurality of linear paths combined in a meander form wherein the movement of said object is uniform within each of said plurality of linear paths, and wherein measurement takes place during movement of said object along said plurality of linear paths, and wherein displacement of charges between said charge storage elements of said sensor array is synchronized with a motion of image points of said object on said sensor array, and wherein said sensor array has bi-directional scanning capabilities allowing said displacement of charges in two opposite directions.

2. The confocal microscope according to claim 1, wherein said diaphragm array is fixed relative to an observation beam path during said movement of said object.

3. The confocal microscope according to claim 2, wherein said diaphragm array has a plurality of transparent regions that are arranged such that image paths of said plurality of transparent regions in said focal plane of said objective fill a portion of said focal plane of said objective without gaps.

4. The confocal microscope according to claim 1, wherein a light source array is arranged for producing a plurality of mutually spaced-apart light sources in a plane conjugate of said focal plane of said objective, and positions of said plurality of light sources are conjugate to positions of transparent regions of said diaphragm array.

5. The confocal microscope according to claim 1, wherein said sensor array has a plurality of mutually parallel linear sensor columns, and said charges are displaced in a direction of said sensor columns.

6. The confocal microscope according to claim 5, wherein said diaphragm array has a plurality of transparent regions, and each column of said sensor array has at least one of said transparent regions imaged on it.

7. The confocal microscope according to claim 6, wherein said transparent regions of said diaphragm array form a two-dimensional rhombic grid arrangement.

8. The confocal microscope according to claim 7, wherein said transparent regions of said diaphragm array form a two-dimensional rectangular grid arrangement.

9. The confocal microscope according to claim 8, wherein said diaphragm array is imaged on said sensor array.

10. The confocal microscope according to claim 5, wherein said sensor array comprises a plurality of mutually independent partial sensors arranged one behind the other in a columnar direction, mutually offset in a row direction by a distance ($\Delta$) equal to d/n, where d is the spacing of individual sensors in said row direction and n is the number of said partial sensors.

11. A confocal microscope having an optical axis and an objective with a focal plane, comprising:

a motorized scanning table for moving an object at right angles to said optical axis of said microscope, a diaphragm array in a plane that is conjugate to said focal plane of said microscope objective, a sensor array following said diaphragm array in an observation direction, with a plurality of photosensitive elements, said diaphragm array effecting a confocal filter of light scattered or reflected at said object before reaching said sensor array, charge storage elements associated with said photosensitive elements, a device for displacing charges stored in said charge storage elements from one charge storage element to another charge storage element, wherein said object is moved along a plurality of linear paths combined in a meander form wherein the movement of said object is uniform within each of said plurality of linear paths, and wherein measurement takes place during movement of said object along said plurality of linear paths, and wherein displacement of charges between said charge storage elements of said sensor array is synchronized with the motion of image points of said object on said sensor array, and position measuring systems are provided to measure said movement of said object in two mutually perpendicular directions, a host computer is provided providing reference position data, a microcontroller is provided that controls a drive of said scanning table in accordance to differences between position measurement data provided by said position measurement systems and reference position values calculated from said reference position data provided by said host computer, and said microcontroller further controlling a drive for affecting said displacement of charges between said charge storage elements of said sensor array in accordance with said reference position data provided by said host computer.

12. The confocal microscope according to claim 11, wherein said positions measuring systems comprise length measuring interferometers.

13. The confocal microscope according to claim 11, wherein said diaphragm array is fixed relative to an observation beam path during said movement of said object.

14. The confocal microscope according to claim 13, wherein said diaphragm array has a plurality of transparent regions that are arranged such that image paths of said plurality of transparent regions in said focal plane of said objective fill a portion of said focal plane of said objective without gaps.

15. The confocal microscope according to claim 11, wherein a light source array is arranged for producing a plurality of mutually spaced-apart light sources in a plane conjugate of said focal plane of said objective, and positions of said plurality of light sources are conjugate to positions of transparent regions of said diaphragm array.

16. The confocal microscope according to claim 11, wherein said sensor array has a plurality of mutually parallel linear sensor columns, and said charges are displaced in a direction of said sensor columns.

17. The confocal microscope according to claim 16, wherein said diaphragm array has a plurality of transparent regions, and each column of said sensor array has at least one of said parent regions imaged on it.

18. The confocal microscope according to claim 17, wherein said transparent regions of said diaphragm array form a two-dimensional rhombic grid arrangement.

19. The confocal microscope according to claim 18, wherein said transparent regions of said diaphragm array form a two-dimensional rectangular grid arrangement.

20. The confocal microscope according to claim 19, wherein said diaphragm array is imaged on said sensor array.

21. The confocal microscope according to claim 16, wherein said sensor array comprises a plurality of mutually independent partial sensors arranged one behind the other in a columnar direction, mutually offset in a row direction by a distance ($\Delta$) equal to d/n, where d is the spacing of individual sensors in said row direction and n is the number of said partial sensors.

22. A confocal microscope having an optical axis and an objective with a focal plane, comprising:
 a motorized scanning table for moving an object at right angles to said optical axis of said microscope,
 a diaphragm array in a plane that is conjugate to said focal plane of said microscope objective,
 a sensor array following said diaphragm array in an observation direction, with a plurality of photosensitive elements, said diaphragm array effecting a confocal filtering of light scattered or reflected at said object before reaching said sensor array,
 charge storage elements associated with said photosensitive elements,
 a device for displacing charges stored in said charge storage elements from one charge storage element to another charge storage element,
 wherein said object is moved along a plurality of linear paths combined in a meander form wherein the movement of said object is uniform within each of said plurality of linear paths, and
 wherein measurement takes place during movement of said object along said plurality of linear paths, and
 wherein displacement of charges between said charge storage elements of said sensor array is synchronized with a motion of image points of said object on said sensor array, and
 wherein position measuring systems are provided to measure said movement of said object in two mutually perpendicular directions, and wherein said position measuring systems comprise length measuring interferometers.

23. The confocal microscope according to claim 22, wherein said diaphragm array is fixed relative to an observation beam path during said movement of said object.

24. The confocal microscope according to claim 23, wherein said diaphragm array has a plurality of transparent regions that are arranged such that image paths of said plurality of transparent regions in said focal plane of said objective fill a portion of said focal plane of said objective without gaps.

25. The confocal microscope according to claim 22, wherein a light source array is arranged for producing a plurality of mutually spaced-apart light sources in a plane conjugate of said focal plane of said objective, and positions of said plurality of light sources are conjugate to positions of transparent regions of said diaphragm array.

26. The confocal microscope according to claim 22, wherein said sensor array has a plurality of mutually parallel linear sensor columns, and said charges are displaced in a direction of said sensor columns.

27. The confocal microscope according to claim 26, wherein said diaphragm array has a plurality of transparent regions, and each column of said sensor array has at least one of said transparent regions imaged on it.

28. The confocal microscope according to claim 27, wherein said transparent regions of said diaphragm array form a two-dimensional rhombic grid arrangement.

29. The confocal microscope according to claim 27, wherein said transparent regions of said diaphragm array form a two-dimensional rectangular grid arrangement.

30. The confocal microscope according to claim 29, wherein said diaphragm array is imaged on said sensor array.

31. The confocal microscope according to claim 26, wherein said sensor array comprises a plurality of mutually independent partial sensors arranged one behind the other in a columnar direction, mutually offset in a row direction by a distance ($\Delta$) equal to d/n, where d is the spacing of individual sensors in said row direction and n is the number of said partial sensors.

32. A confocal microscope having an optical axis and an objective with a focal plane, comprising:
 a motorized scanning table for moving an object at right angles to said optical axis of said microscope,
 a diaphragm array in a plane that is conjugate to said focal plane of said microscope objective,
 a sensor array following said diaphragm array in an observation direction, with a plurality of photosensitive elements, said diaphragm array effecting a confocal filtering of light scattered or reflected at said object before reaching said sensor arrays,
 charge storage elements associated with said photosensitive elements,
 a device for displacing charges stored in said charge storage elements form one charge storage element to another charge storage element,
 wherein said object is moved along a plurality of linear paths combined in a meander form wherein the movement of said object is uniform within each of said plurality of linear paths, and
 wherein measurement takes place during movement of said object along said plurality of linear paths, and
 wherein displacement of charges between said charge storage elements of said sensor array is synchronized with a motion of image points of said object on said sensor array, and wherein said diaphragm array is anamorphotically imaged on said sensor array and said diaphragm array is imaged on said sensor array with a larger imaging scale in a direction of said sensor columns than in a direction perpendicular to said direction of said sensor columns,
 wherein a ratio of anamorphotic imaging in two perpendicular directions corresponds to a number of partial sensors provided.

33. The confocal microscope according to claim 32, wherein nine said partial sensors are provided and said anamorphotic imaging has a ratio of 9:1.

34. The confocal microscope according to claim 32, wherein said diaphragm array is fixed relative to an observation beam path during said movement of said object.

35. The confocal microscope according to claim 34, wherein said diaphragm array has a plurality of transparent regions that are arranged such that image paths of said plurality of transparent regions in said focal plane of said objective fill a portion of said focal plane of said objective without gaps.

36. The confocal microscope according to claim 32, wherein a light source array is arranged for producing a plurality of mutually spaced-apart light sources in a plane conjugate of said focal plane of said objective, and positions of said plurality of light sources are conjugate to positions of transparent regions of said diaphragm array.

37. The confocal microscope according to claim 32, wherein said sensor array has a plurality of mutually parallel linear sensor columns, and said charges are displaced in a direction of said sensor column.

38. The confocal microscope according to claim 37, wherein said diaphragm array has a plurality of transparent regions, and each column of said sensor array has at least one of said transparent regions imaged on it.

39. The confocal microscope according to claim 38, wherein said transparent regions of said diaphragm array form a two-dimensional rhombic grid arrangement.

40. The confocal microscope according to claim 38, wherein said transparent regions of said diaphragm array form a two-dimensional rectangular grid arrangement.

41. The confocal microscope according to claim 40, wherein said diaphragm array is imaged on said sensor array.

42. The confocal microscope according to claim 37, wherein said sensor array comprises a plurality of mutually independent partial sensors arranged one behind the other in a columnar direction, mutually offset in a row direction by distance ($\Delta$) equal to d/n, where d is the spacing of individual sensors is said row direction and n is the number of said partial sensors.

* * * * *